(12) United States Patent
Murphy et al.

(10) Patent No.: US 7,477,657 B1
(45) Date of Patent: Jan. 13, 2009

(54) AGGREGATING END-TO-END QOS SIGNALED PACKET FLOWS THROUGH LABEL SWITCHED PATHS

(75) Inventors: James Murphy, San Ramon, CA (US); Ping Pan, Emerson, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 1319 days.

(21) Appl. No.: 10/142,730

(22) Filed: May 8, 2002

(51) Int. Cl.
*H04J 3/16* (2006.01)

(52) U.S. Cl. .................... 370/468; 370/351; 370/437

(58) Field of Classification Search .............. None
See application file for complete search history.

(56) References Cited

U.S. PATENT DOCUMENTS

| | | | |
|---|---|---|---|
| 6,351,465 B1* | 2/2002 | Han ..................... | 370/395.43 |
| 6,671,256 B1* | 12/2003 | Xiong et al. ............... | 370/230 |
| 6,765,921 B1* | 7/2004 | Stacey et al. ............... | 370/401 |
| 6,876,668 B1* | 4/2005 | Chawla et al. ............. | 370/468 |
| 6,956,821 B2* | 10/2005 | Szviatovszki et al. ....... | 370/237 |
| 7,046,669 B1* | 5/2006 | Mauger et al. ............. | 370/393 |
| 7,061,921 B1* | 6/2006 | Sheth ....................... | 370/389 |
| 7,076,540 B2* | 7/2006 | Kurose et al. .............. | 709/223 |
| 7,082,140 B1* | 7/2006 | Hass ......................... | 370/466 |
| 7,136,357 B2* | 11/2006 | Soumiya et al. ........... | 370/236 |
| 7,177,921 B2* | 2/2007 | Taguchi .................... | 709/220 |
| 7,184,434 B2* | 2/2007 | Ganti et al. ................ | 370/389 |
| 7,209,977 B2* | 4/2007 | Acharya et al. ........... | 709/240 |
| 7,257,120 B2* | 8/2007 | Saunders et al. ....... | 370/395.21 |
| 7,283,477 B1* | 10/2007 | Fedyk et al. ............... | 370/237 |
| 2002/0087699 A1* | 7/2002 | Karagiannis et al. ....... | 709/227 |
| 2002/0141345 A1* | 10/2002 | Szviatovszki et al. ...... | 370/238 |
| 2003/0117950 A1* | 6/2003 | Huang ...................... | 370/220 |
| 2003/0137978 A1* | 7/2003 | Kanetake .................. | 370/386 |
| 2003/0156541 A1* | 8/2003 | Haihong .................... | 370/235 |
| 2004/0213221 A1* | 10/2004 | Civanlar et al. ............ | 370/389 |
| 2006/0039364 A1* | 2/2006 | Wright ...................... | 370/352 |

OTHER PUBLICATIONS

Daniel O. Awduche et al., Applicability Statement for Extensions to RSVP for LSP-Tunnels, Internet Engineering Taskforce, MPLS Working Group, Jan. 2000, 6 pages.

Daniel O. Awduche et al., Extensions to RSVP for LSP Tunnels, The Internet Society, Dec. 2001, 52 pages.

(Continued)

*Primary Examiner*—Phirin Sam
(74) *Attorney, Agent, or Firm*—Shumaker & Sieffert, P.A.

(57) ABSTRACT

Techniques are described for supporting end-to-end resource reservation protocols, such as the Resource Reservation Setup Protocol (RSVP), using Multi-protocol Label Switching (MPLS). A routing device, such as an edge router coupling a local network to another network, aggregates packet flow reservation requests, and maps the resource requests to Labeled Switch Paths (LSPs) capable of supporting the requested resources. Requests having common forwarding equivalence classes may be aggregated to flow through a single LSP having resources, such as bandwidth, capable of supporting the requests. Routers and other devices within the network need not monitor and support state information associated with the individual end-to-end packet flows. A method, for example, includes mapping requests for end-to-end packet flows through a network to LSPs within the network, and forwarding packets associated with the end-to-end packet flows along the LSPs based on the mapping.

44 Claims, 7 Drawing Sheets

OTHER PUBLICATIONS

Daniel O. Awduche et al., Applicability Statement for Extensions, The Internet Society, Dec. 2001, 7 pages.

"A Framework for Integrated Services Operation over Diffserv Networks" Y. Bernet et al., RFC 2998, pp. 1-29, Nov. 2000.

"A Two-bit Differentiated Services Architecture for the Internet" K. Nichols et al., RFC 2638, pp. 1-13, Jul. 1999.

"Aggregating RSVP-based QoS Requests" R. Guerin et al., Internet Draft, draft-guerin-aggreg-rsvp-00.txt, Nov. 21, 1997.

"Scalable Resource Reservation Signaling in the Internet" Ping Pan, Columbia Univeristy, 2002.

"Aggregation of RSVP for IPv4 and IPv6 Reservations" F. Baker et al., RFC 3175, pp. 1-34, Sep. 2001.

* cited by examiner

RESERVATION DATA — 60

| FLOW 1 | 243.48.1.14 | 107.13.1.27 | 8 Mbps | 10,000 |
|---|---|---|---|---|
| FLOW 2 | 243.48.1.3 | 107.13.1.30 | 4 Mbps | 10,000 |
| FLOW 3 | 243.48.1.3 | 204.57.1.4 | 4 Mbps | 5,000 |

PATH DATA — 61

| LSP 1 | 243.48.1.0 | 107.13.1.0 | 12 Mbps | 12 Mbps |
|---|---|---|---|---|
| LSP 2 | 243.48.1.0 | 107.13.1.0 | 128 Mbps | 4 Mbps |

MAPPING DATA — 62

| FLOW 1 | LSP 1 |
|---|---|
| FLOW 2 | LSP 1 |
| FLOW 3 | LSP 2 |

FIG. 4

AGGREGATING END-TO-END QOS SIGNALED PACKET FLOWS THROUGH LABEL SWITCHED PATHS

TECHNICAL FIELD

The invention relates to computer networks and, more particularly, to techniques for providing Quality of Service (QoS) within computer networks.

BACKGROUND

The Resource Reservation Setup Protocol (RSVP) is a communications protocol that enables the reservation of resources for packet flows from a source device to a destination device. Using RSVP, a source device can request a Quality-of-Service (QoS) class that supports a level of communication throughput, typically including a defined bandwidth allocation and burst size. RSVP-enabled routers forward the request, and establish a defined route within the network able to commit the resources to satisfy the request. Devices often employ resource reservation techniques to support transmission of real-time data, such as video of voice data, over packet-based networks.

Although advantageous in that it allows the specification of QoS classes and the reservation of end-to-end resources, the support of the RSVP protocol or other resource reservation protocols can introduce significant overhead within a network. Routing devices handling the packet flow along the reserved route, for example, must continually monitor resource allocation and maintain significant state data related to the route. As a result, support for such protocols can be difficult in networks, especially large networks, such as the Internet, in which there may tens of thousands of devices concurrently reserving and making use of resources along end-to-end routes.

SUMMARY

In general, the invention is directed to techniques for supporting end-to-end resource reservation protocols, such as the Resource Reservation Setup Protocol (RSVP), using Multiprotocol Label Switching (MPLS). Routing devices, such as edge routers that connect local networks to larger networks, receive packet flow reservation requests, and map the requests to Label Switched Paths (LSPs) that support differentiated services (diffserv), i.e., LSPs capable of providing resources for differentiated classes of service for traffic. A flow generally represents packets having a common set of attributes, such as source and destination addresses, protocol, protocol port numbers, type-of-service (ToS) byte, DiffServe Code Point (DSCP), or the like. Packet flows having common forwarding equivalence classes and QoS requirements may be aggregated to flow through a single LSP having allocated resources, such as bandwidth, capable of supporting the QoS requirement.

The routing devices encapsulate the reservation requests and other control packets within MPLS packets, and forward the MPLS packets through the LSPs. In this manner, the encapsulated end-to-end resource reservation requests are "opaque" to the network as the MPLS packets flow through the LSPs. Similarly, the routing devices encapsulate data packets associated with the requested end-to-end packet flows within MPLS packets, and forward the encapsulated packets. Accordingly, routers and other devices within the network need not monitor and support state information associated with the individual end-to-end packet flows.

In one embodiment, a method comprises receiving a request to reserve resources for a packet flow through a network, and assigning a label to the request to encapsulate the request within a Multiprotocol Label Switching (MPLS) packet. The method further comprises forwarding the MPLS packet along a Labeled Switch Path (LSP) in accordance with the label.

In another embodiment, a method comprises mapping requests for end-to-end packet flows through a network to Labeled Switch Paths (LSPs) within the network, and forwarding packets associated with the end-to-end packet flows along the LSPs based on the mapping.

In another embodiment, a method comprises receiving a plurality of requests that conform to the Resource Reservation Setup Protocol (RSVP), and that specify Quality of Service (QoS) requirements for packet flows through a network. The method further comprises mapping the RSVP requests to a set of Label Switched Paths (LSPs) of the network based on the QoS requirements of the requests and current bandwidth allocations for the LSPs.

In another embodiment, a computer-readable medium comprises reservation data representative of requests to reserve resources for packet flows through a network, path data representative of Labeled Switch Paths (LSPs) within the network, and mapping data associating the requests with the LSPs.

In another embodiment, a computer-readable medium comprises instructions to cause a processor to receive a request to reserve resources for a packet flow through a network, and assign a label to the request to encapsulate the request within a Multiprotocol Label Switching (MPLS) packet. The medium further comprises instructions to forward the MPLS packet along a Labeled Switch Path (LSP) in accordance with the label.

In another embodiment, a routing device comprises an access control module to generate a mapping between requests for end-to-end packet flows through a network and Labeled Switch Paths (LSPs) within the network, and a control unit to forward packets associated with the end-to-end packet flows along the LSPs based on the mapping. The requests may, for example, conform to RSVP, and may specify QoS requirements for packet flows through a network. The access control module may map the requests to the LSPs based on the QoS requirements of the requests and current bandwidth allocations for the LSPs. The routing service may further comprise an accounting module to generate accounting data describing the QoS requirements specified by the requests, and consumption of bandwidth allocated to the LSPs.

In another embodiment, a system comprises a first network having a plurality of devices and a router, and a second network having a plurality of devices and a router. The first and second routers receive requests to reserve resources along end-to-end packet flows between the devices of the first and second networks, and map the requests to a Labeled Switch Path (LSP) coupling the first and second networks through an intermediate network.

The invention may provide one or more advantages. For example, the techniques may provide for the aggregation of packets associated with end-to-end packet flows, and for the forwarding of the packets as MPLS packets through an intermediate network. Computing devices of local networks supporting a signaling protocol, such as RSVP, can be coupled via an intermediate network, e.g., the Internet, and can reserve resources to support various Quality of Service requirements. Accordingly, the techniques support transmission of real-time data, such as video or voice data, without requiring that routers and other devices within the intermediate network monitor resource allocation and maintain state information associated with each of the individual end-to-end packet flows. Furthermore, some resource reservation protocols, such as RSVP, require periodic refresh messages for each flow. The number of refresh messages can be drastically reduced within the intermediate network by aggregating end-to-end packet flows through LSPs.

In addition, the techniques may provide for the authentication of computing devices seeking to reserve resources for packet flows through a network, and may maintain accounting information and other data for the management of network utilization by the devices of the local network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating example data structures maintained by the router of FIG. 3 to aggregate end-to-end packet flows into one or more LSPs

DETAILED DESCRIPTION

Figure 1:
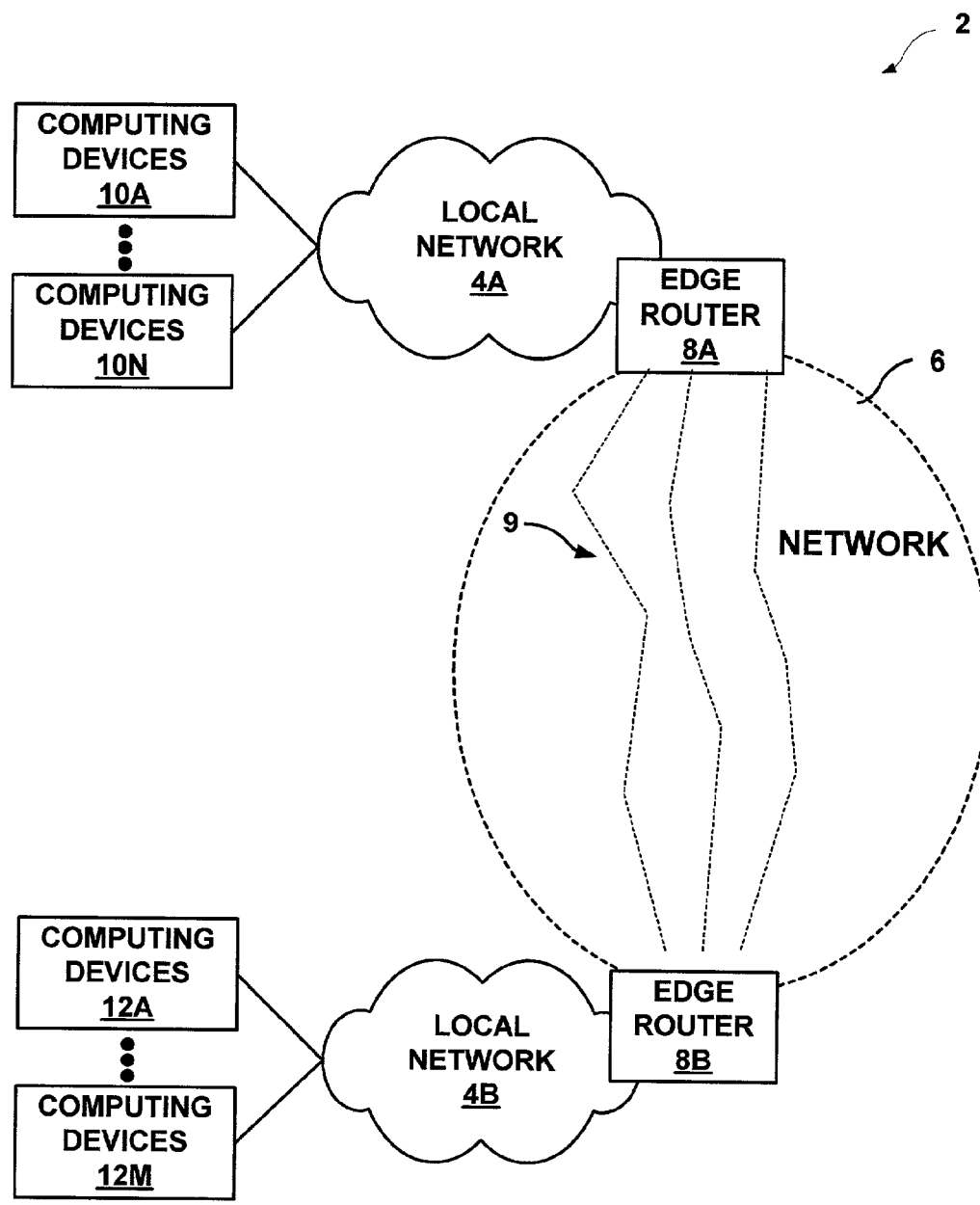
FIG. 1 is a block diagram illustrating an example system in which packet flows for reserved end-to-end packet flows are aggregated into Label Switched Paths (LSPs) that provide differentiated classes of service in accordance with the principles of the invention.

FIG. 1 is a block diagram illustrating an example system 2 in which reserved end-to-end packet flows are aggregated using Multi-protocol Label Switching (MPLS) in accordance with the principles of the invention. More specifically, system 2 includes local networks 4A, 4B (herein local networks 4) that support a reservation protocol, such as the Resource Reservation Setup Protocol (RSVP). Accordingly, local networks 4 may comprise RSVP-enabled networks coupled via an intermediate network 6, which may comprise a number of routing devices, switches, and the like (not shown). Although described in reference to RSVP, the techniques may be applied to other reservation protocols or QoS signaling methods, such as protocols from the Next Steps in Signaling (NSIS) working group of the Internet Engineering Task force (IETF), or the like.

Computing devices 10A-10N (herein computing devices 10) and computing devices 12A-12M (computing devices 12) of local networks 4 issue requests to edge routers 8A, 8B to reserve resources along end-to-end packet flows. For example, computing device 10A of local network 4A may issue a request to reserve resources for a packet flow from computing device 10A to computing device 12A of local network 4B. The request may take the form of an RSVP RESV request. Each request may specify a Quality of Service class having corresponding requirements for bandwidth and burst size. In this manner, computing devices 10, 12 may request the reservation of resources to carry specific packet flows, such as real-time audio and video streams. Example computing devices 10, 12 include workstations, servers, laptops, personal digital assistants (PDAs), wireless devices, and the like.

Edge routers 8A, 8B (herein edge routers 8) couple local networks 4 to an intermediate network 6. In general, edge routers 8 receive the packet flow reservation requests from computing devices 10, 12, and map the requests to one or more Label Switched Paths (LSPs) 9 that support differentiated services. In other words, routing devices within network 6 maintain LSPs 9 to provide resources for differentiated classes of service for traffic. As described in detail below, edge routers 8 select LSPs 9 for supporting the packet flows based on a variety of criteria, including the Quality of Service (QoS) requirements, and source and destination devices 10, 12 specified by the requests. For example, edge routers 8 may map requested packet flows sharing a forwarding equivalence class within network 8 to a single LSP having resources, such as bandwidth, capable of supporting the aggregate resources specified by the requests. Generally, a forwarding equivalence class in refers to a set of destination prefixes having the same egress node across an MPLS network. In this manner, an LSP may carry traffic associated with a number of flows from network 4A to 4B, regardless of whether flows have the same resource or destination address. A flow generally represents packets having a common set of attributes that may include, source and destination addresses, protocol, protocol port numbers, type-of-service (ToS) byte, DiffServe Code Point (DSCP), or the like.

Upon receiving packet flow reservation requests, edge routers 8 encapsulate the requests within MPLS packets, and forward the MPLS packets through LSPs 9. In this manner, the encapsulated end-to-end resource reservation requests and other associated control packets are "opaque" to network 6 as the MPLS packets flow through LSPs 9. Similarly, edge routers 8 encapsulate data packets associated with the requested end-to-end flows within MPLS packets, and forward the MPLS packets. In other words, edge routers 8 encapsulate the packet flows, such as the real-time audio or video streams, produced by computing devices 10, 12 and associated with the reserved packet flows. The encapsulated packet flows traverse LSPs 9 of network 6 as MPLS packets. Accordingly, routers and other devices within network 6 need not monitor resource allocation and maintain state information associated with each of the individual end-to-end packet flows between computing devices 10, 12. Label-switching routers within network 6 forward the end-to-end packet flows in accordance with the labels of the packets, and without regard to the content of the packets.

Edge routers may map the requests to pre-established LSPs 9, or dynamically construct one or more LSPs 9 through network 6 in accordance with the Multiprotocol Label Switching (MPLS) protocol. To construct LSPs 9 within network 6, routers 8 may issue control messages specifying a sequence of hops within network 6 for each of LSPs 9. The control messages flow through network 6, and communicate the necessary label-forwarding information to the internal routers.

Figure 2:
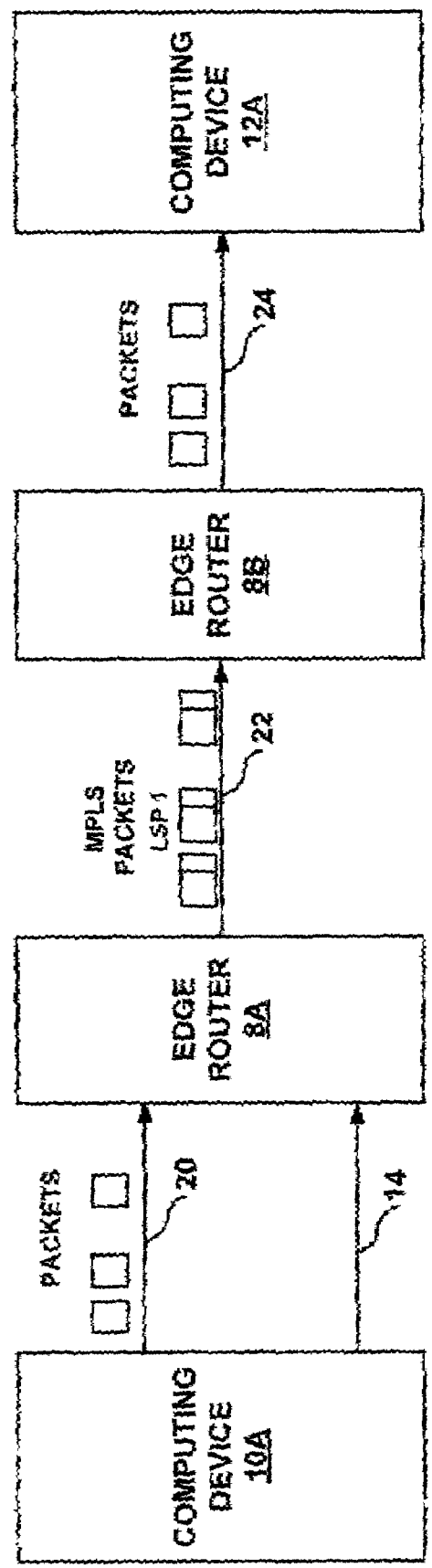
FIG. 2 is a block diagram further illustrating the techniques for supporting end-to-end packet flow reservation using LSPs.

FIG. 2 is a block diagram further illustrating the techniques for supporting end-to-end packet flow reservation using Labeled Switch Paths (LSPs). Initially, computing device 10A outputs a request 14 to reserve resources for a packet flow from computing device 10A to computing device 10B. In response, router 8a selects a first Label Switched Path (LSP1) having a termination point of edge router 8B, and capable of supporting the requested Quality of Service (QoS) class specified by the request.

Edge router 8A receives packets 20 produced by computing device 10A and associated with the requested packet flow, and assigns a common MPLS label to each of packets 20 to form MPLS packets 22. Router 8a may, for example, prepend the MPLS label to each of packets 20. Router 8a forwards MPLS packets 22 to router 8b via label switch path 1 (LSP1). Because router 8a assigns each of MPLS packets 22 a common label, each packet flows down a common Label Switched Path, i.e., LSP1.

Upon receiving MPLS packets 22, router 8b removes the MPLS labels to produce packets 24 in their original form. Router 8b forwards packets 24 to computing device 12A via local network 4B. In this manner, packets associated with an end-to-end reserved route flow through an LSP. In similar fashion, router 8a may forward other end-to-end packets flows from computing devices 10 of local network 4A to computing devices 12 of local network 4B via LSP 1, thereby aggregating multiple end-to-end packet flows through a common LSP. Response signaling messages, such as RSVP REPLY messages, from edge router 8b may flow to edge router 8a through intermediate network 6 in normal manner, e.g., as RSVP response messages, or may be encapsulated as MPLS packets and flow through a second LSP coupling edge routers 8.

Figure 3:
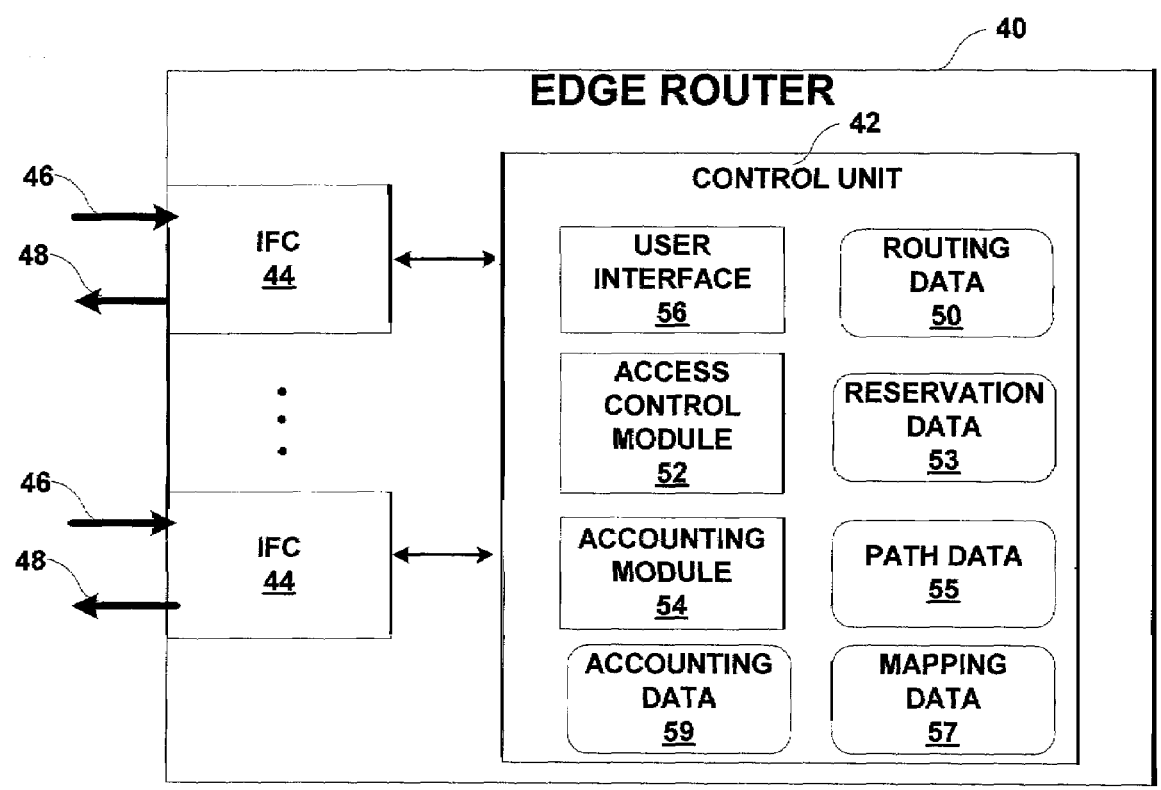
FIG. 3 is a block diagram of an example embodiment of a router that services requests for reservation of end-to-end packet flows using LSPs in accordance with the principles of the invention.

FIG. 3 is a block diagram of an example embodiment of a router 40 that services requests for end-to-end packet flows using Labeled Switch Paths in accordance with the principles of the invention. In the exemplary embodiment illustrated in FIG. 3, router 40 includes interface cards (IFCs) 44 for communicating packets via network links 46 and 48. IFCs 44 are typically coupled to network links 46, 48 via a number of interface ports.

Router 40 includes a control unit 42 that maintains routing data 50, which describes a network topology. In particular, routing data 50 describes various routes within one or more networks, such as a local networks 4 and network 6 of FIG. 1, and the appropriate next hop for each route, i.e., the neighboring devices of router 40 along each of the routes. Routing data 50 associates the next hops with the interfaces ports of IFCs 44 that couple router 40 to network link 48. In this manner, routing data 50 may map LSPs within the network to particular interface ports of IFCs 44.

In addition, access control module 52 of control unit 42 generates and maintains reservation data 53 representative of the packet flow reservation requests received by router 40. For example, reservation data 53 specifies a source device, a destination device, and a QoS class, including required bandwidth and burst size, for each requested packet flow. Access control module 52 also generates and maintains path data 55 representative of LSPs within the network. Path data 55 may, for example, specify an ingress device and an egress device for each LSP, as well as a total bandwidth and current bandwidth usage for the LSP. Access control module 52 maintains mapping data 57 to associate each request of reservation data 53 with one of the LSPs of LSP data 55.

Access control module 52 stores reservation data 53, path data 55 and mapping data 57 on one or more computer-readable media, such as a magnetic medium, optical medium, non-volatile random access memory (NVRAM), FLASH memory, or the like. Access control module 52 may maintain the data in the form of a variety of data structures, such as tables, radix trees, flat files, and databases.

In general, router 40 aggregates end-to-end packet flows between devices, and directs the aggregated packet flows along one or more LSPs. More specifically, control unit 42 receives packets associated with end-to-end packet flows from IFCs 44. Access control module 52 of control unit 42 selectively assigns each inbound packet an appropriate MPLS label to form outbound MPLS packets based on reservation data 55, path data 57, and map data 59. For example, the requests may conform to the RSVP, and may specify Quality of Service (QoS) requirements. Access control module 52 maps the request and associated packets to one or more LSPs specified by path data 55 based on the QoS requirements of the requests, and current bandwidth allocations for the LSPs. In accordance with routing data 50, control unit 42 forwards the MPLS packets to an intermediate network, such as network 6, via network link 48.

Access control module 52 may receive configuration input from user interface 56 that describes a set of pre-established LSPs, or may dynamically generate control information for forming LSPs through the intermediate network in response to receiving the requests. Accounting module 54 monitors the end-to-end packet flows, and generates accounting data 59. Accounting data 59 may include, for example, the QoS requirements specified by the aggregated requests for each LSP, total packets received from a source device for each packet flow, a QoS level available to the source device, as possibly controlled by a service level agreement (SLA), current use of bandwidth available along each LSP, or the like. Control unit 42 presents user interface 56 by which a user, such as a system administrator, can view accounting data 59.

When operating as an egress device for an LSP, one or more IFCs 44 receive MPLS packets from network links 46, and communicate the MPLS packets to control unit 42. Access control module 52 of control unit 42 removes the labels from the MPLS packets to extract the packets in their original form. Control unit 42 forwards the packets to computing devices of a local network via one or more IFCs 44. In this manner, end-to-end packet flows in accordance with a route reservation protocol, such as RSVP, transparently flow through an intermediate network encapsulated within MPLS packets associated with one or more LSPs. Accordingly, routers and other devices within network 6 need not monitor resource allocation and support state information associated with the individual end-to-end packet flows between computing devices.

The architecture of router 40 illustrated in FIG. 3 is for exemplary purposes only. The invention is not limited to this architecture. In other embodiments, router 40 may be configured in a variety of ways. In one embodiment, for example, control unit 42 and its corresponding functionality may be replicated and incorporated directly within IFCs 44.

FIG. 4 is a block diagram illustrating example data structures maintained by control unit 42 (FIG. 3) to aggregate end-to-end packet flows into one or more LSPs. In the illustrated embodiment, reservation data 60 is arranged as a table in which each row represents a request to reserve resources for a particular packet flow, e.g., FLOW 1, FLOW 2 and FLOW 3. For each packet flow, reservation data 60 may include an Internet Protocol (IP) address for a source device and a destination device. In addition, reservation data 60 may include a required bandwidth for the requested packet flow and a burst size. Alternatively, reservation data may store identifiers for QoS classes specified by the requests. The data of FIG. 4 is illustrated for exemplary purposes, and may be readily varied. As described, above, a flow generally represents packets having a common set of attributes that may include, source and destination addresses, protocol, protocol port numbers, type-of-service (ToS) byte, DiffServe Code Point (DSCP), or the like. Accordingly, reservation data 60 may include a variety of data describing the common attributes for the flows.

Similarly, path data 61 is arranged as a table in which each row represents an LSP available for carrying one or more packet flows. For each LSP, path data 61 includes IP addresses for an ingress device and an egress device, such as edge routers 8A and 8B. In addition, path data 61 may include a total bandwidth supported for each LSP, and a current usage of the bandwidth.

Mapping data 62 associates each of the packet flows represented by reservation data 60 with an LSP represented by path data 61. In the illustrated example, mapping data 62 associates FLOW 1 and FLOW 2 with LSP 1, and FLOW 3 with LSP 2. As illustrated, the IP addresses for the source and destination devices for FLOW 1 and FLOW 2 reside in the same local network and, therefore, can be aggregated for service by LSP 1. Accordingly, the 8 Mbps and 4 Mbps required by FLOW 1 and FLOW 2, respectively, are reflected in the total allocation of the 12 Mbps bandwidth capacity of LSP 1. LSP 2, however, has significant capacity remaining.

The data structures of in FIG. 4 are illustrated for exemplary purposes only, and may be arranged in any number of forms, and may store a wide variety of additional data. For example, the data structures may be arranged as trees, link lists, databases, flat files, and other data structures. Router 40 may store the data structures for access by control unit 42 within a variety of types of computer-readable media, such as non-volatile random access memory (NVRAM), read-only memory (ROM), dynamic random access memory (DRAM), FLASH memory, magnetic media, optical media, and the like.

Figure 5:
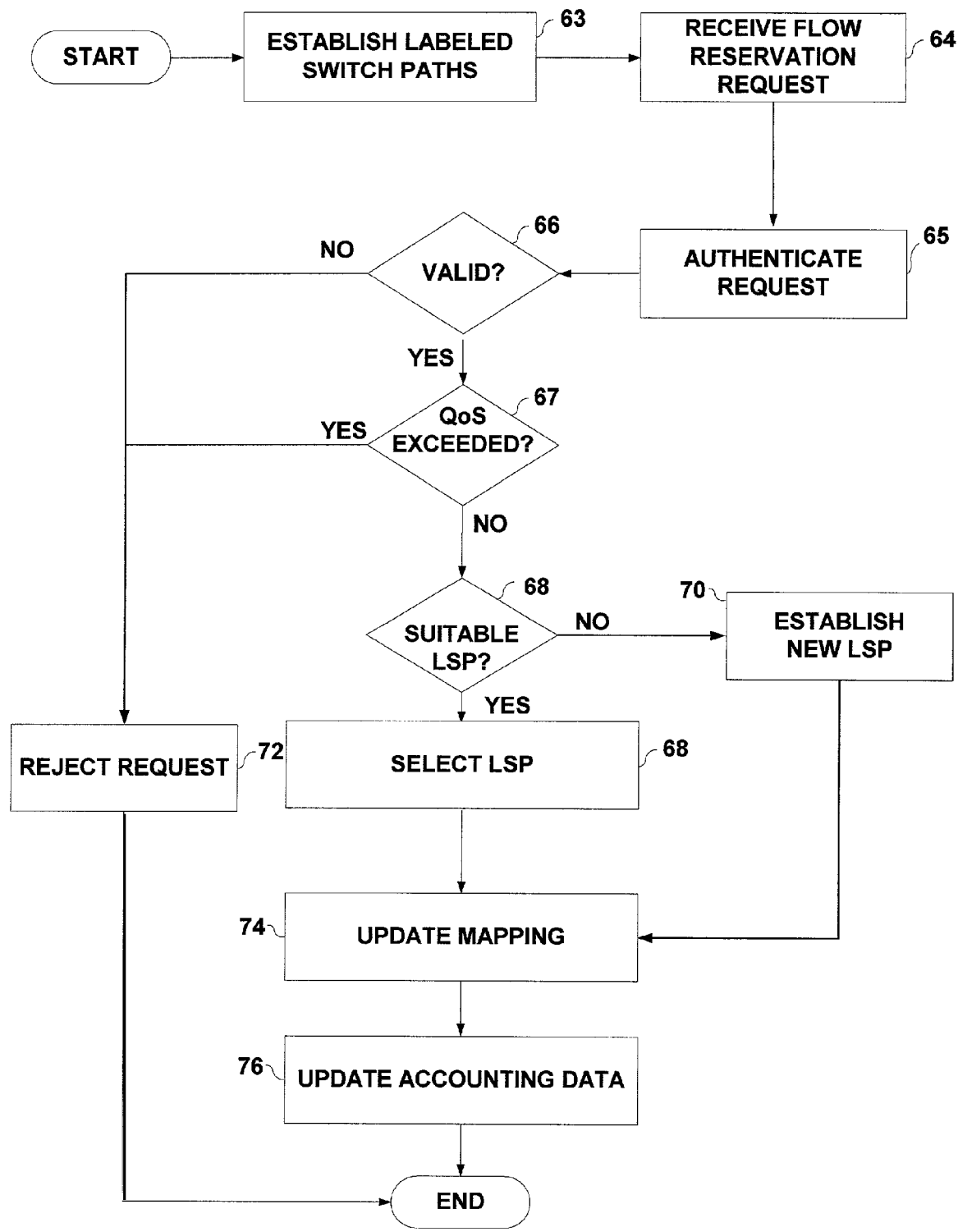
FIG. 5 is a flowchart further illustrating an example mode of operation of the router of FIG. 3 when receiving packet flow reservation requests.

FIG. 5 is a flowchart further illustrating an example mode of operation of router 40 (FIG. 3) when receiving packet flow reservation requests. Initially, control unit 42 receives configuration input from a user, such as a system administrator, specifying one or more LSPs for servicing packet flow reservation requests from computing devices of a local network. Based on the configuration information, control unit 42 may generate control information for forwarding through the intermediate network to establish the LSPs (63). Alternatively, the configuration input may describe pre-established LSPs.

After configuration, router 40 receives a request to reserve resources for a packet flow from a source device to a destination device (64). Access control module 52 may authenticate the requesting device (65) and, if valid (66), determines whether the QoS requirements specified by the request exceed the QoS service level available to the device as, for example, defined by a service level agreement (67). If so, router 40 rejects the request (72).

If not, access control module 52 determines whether a suitable LSP exists for servicing the request, i.e., whether an LSP is currently established that has ingress and egress devices for servicing the source and destination devices of the packet flow, and that has available capacity to meet the QoS requirements of the request (68). If not, access control module 52 forwards control information to the intermediate network to establish an LSP capable of servicing the requested packet flow (70). Access control module 52 updates path data 61 (FIG. 3) to reflect the newly established LSP.

If a suitable LSP exists, or upon establishing the LSP, access control module 52 updates mapping data to associate the requested packet flow with the LSP for carrying the end-to-end packet flow through the intermediate network as MPLS packets (74). Finally, access control module 52 updates accounting data 59 to reflect the allocation of a portion of the resources of the LSP to service the requested packet flow.

Figure 6:
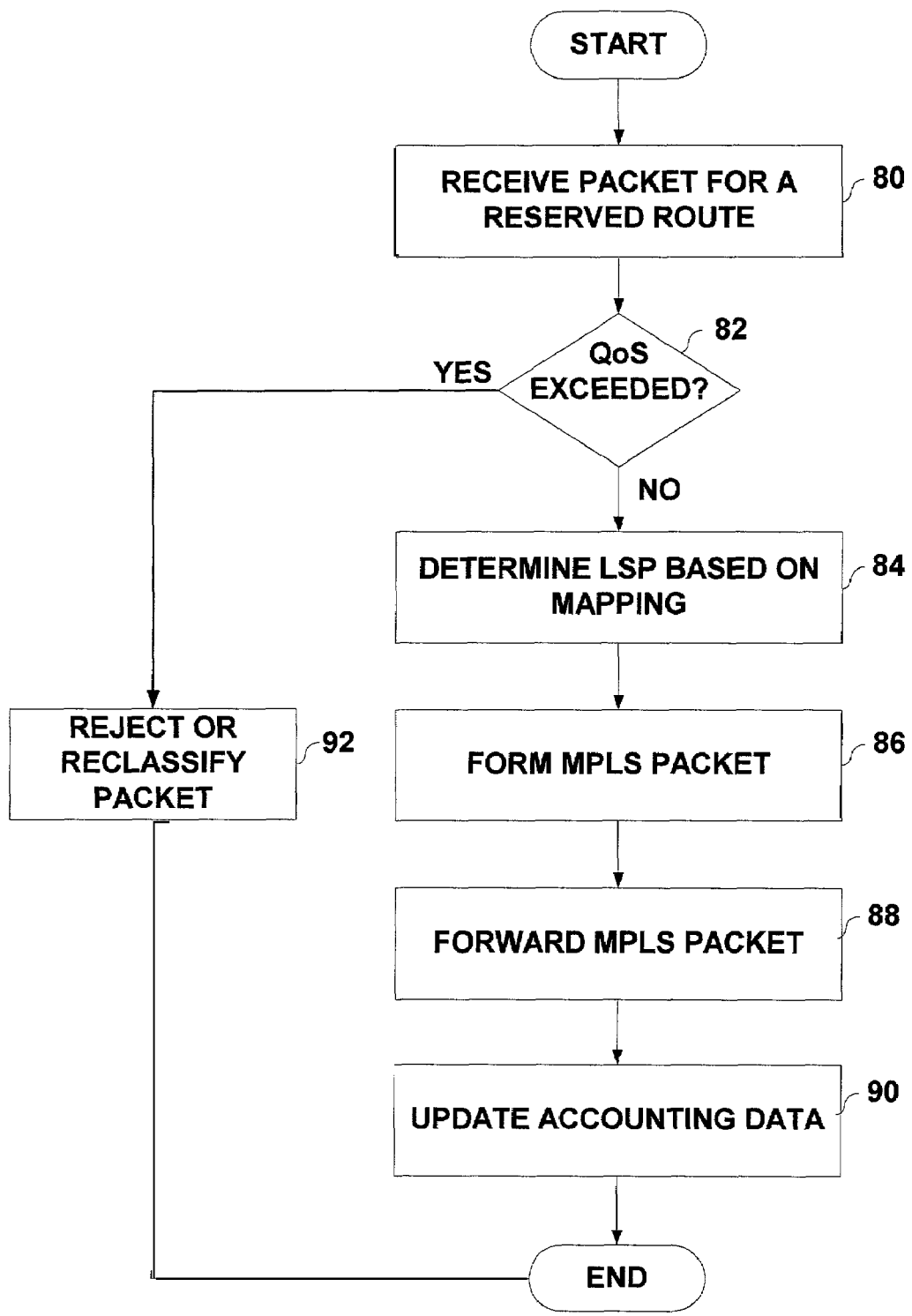
FIG. 6 is a flowchart further illustrating an example mode of operation of the router of FIG. 3 when receiving packets from a device of a local network, and associated with an end-to-end packet flow.

FIG. 6 is a flowchart further illustrating an example mode of operation of router 40 when receiving packets from a device of a local network, and associated with an end-to-end packet flow. Upon receiving such a packet from the device (80), access control module 52 may determine whether the device has exceeded the QoS requirements specified in the initial request (82). For example, access control module 52 may determine whether an average bit rate and burst size for the packet flow produced by the device exceeds the bandwidth and burst size specified by the request. If so, access control module 52 may reject the packet, or reclassify the packet to a lower level of service (92).

Otherwise, access control module 52 determines an LSP for the packet based on mapping data 61 (84), and assigns the packet an appropriate MPLS label for the selected LSP. More specifically, access control module 52 forms an outbound MPLS packet by pre-pending the MPLS label to the packet received from the device (86).

In accordance with routing data 50, control unit 42 forwards the MPLS packets on the intermediate network via the respective LSP (88). In this manner, router 40 relays packets received from a local network, and associated with a packet flow reservation request, along an LSP. Accordingly, routers and other devices within the network, need not monitor and support state information associated with the individual end-to-end packet flows, but need only support aggregated packet flows through LSPs. Upon forwarding the packet, access control module 52 updates accounting data 59 to reflect the current output of the computing device, and the current usage of the respective LSP (90).

Figure 7:
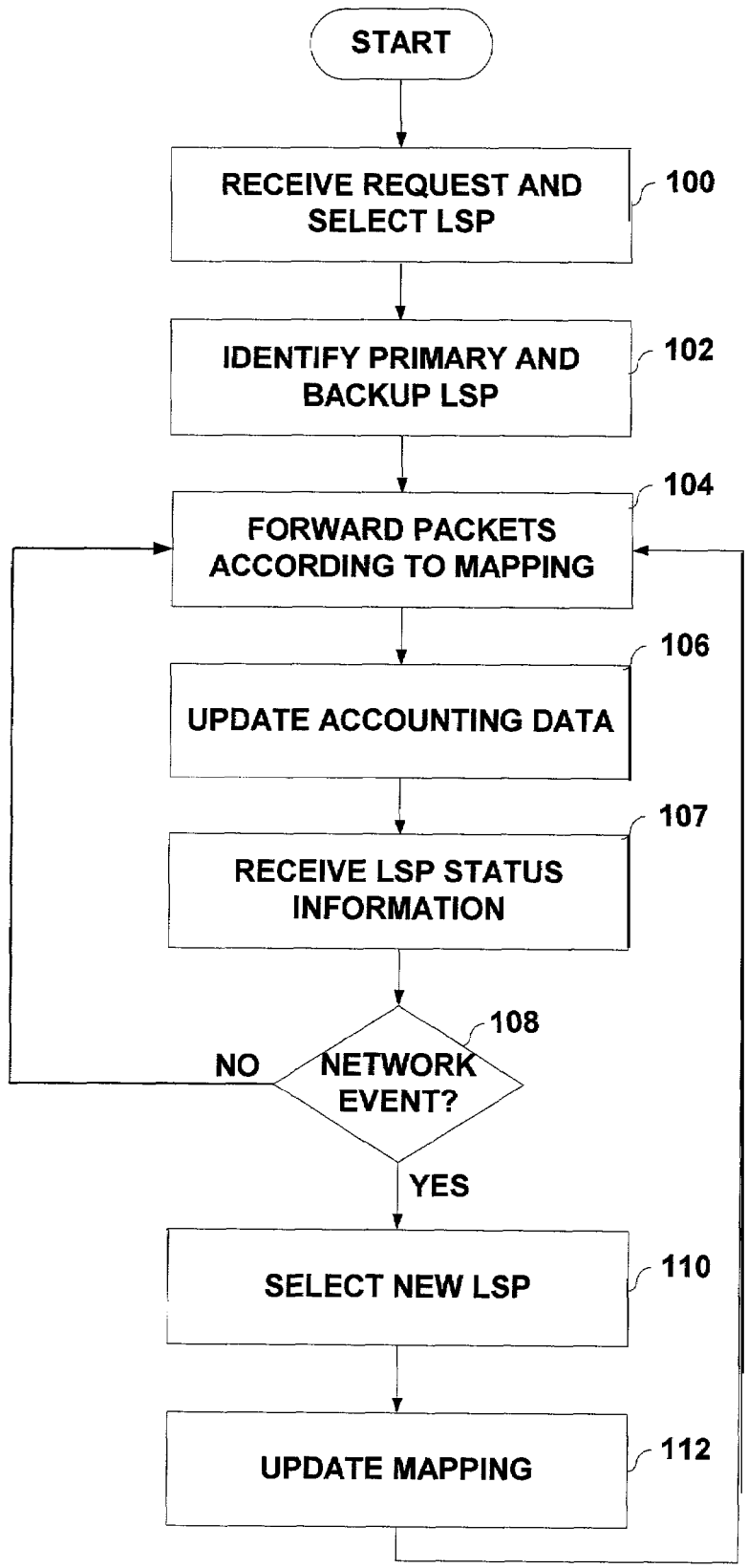
FIG. 7 is a flowchart illustrating an exemplary mode of operation of the router of FIG. 3 to provide a degree of fault-tolerance.

FIG. 7 is a flowchart further illustrating an exemplary mode of operation of router 40 to provide a degree of fault-tolerance to the process. More specifically, upon receiving a packet flow reservation request (100), access control module 52 analyzes path data 55 to identify a primary LSP and at least one backup LSP suitable for servicing the requested packet flow (104).

Next, as described above, access control module 52 receives packets associated with the requested packet flow, forwards the packets through the intermediate network as MPLS packets (104), and updates accounting data 59 accordingly (106). In addition, router 40 receives flow status information, such as MPLS status messages, from routing devices along the flow that describes the current status of the LSP (107). In the occurrence of a network event (108), such as a link failure along the currently used LSP, router 40 selects a new LSP for carrying the end-to-end packet flows serviced by the failed LSP (110). Access control module 52 regenerates mapping data 57 to reflect the reassignment (112). In the event the failed link becomes active, access control module 52 may reassign the packet flows to the primary LSP. Such updates may require that router 40 dismantle previously accepted allocations and notify the requesting devices.

Other techniques can be used to further increase the degree of fault tolerance of the system, such as providing multiple edge routers that couple the local network to the intermediate network. The multiple edge routers may, for example, maintain redundant data describing the mapping of end-to-end packet flows to LSPs. In addition, redundancy features provided by MPLS may be used to further improve fault-tolerance.

Various embodiments of the invention have been described. These and embodiments are within the scope of the following claims.

The invention claimed is:

1. A method comprising:
receiving, in accordance with a resource reservation protocol and with an edge router of an intermediate network located between a source device and a destination, a request to reserve resources for a packet flow along a path through the intermediate network, wherein the request specifies a Quality of Service (QoS) class;
selecting, at the edge router, a Label Switched Path (LSP) within the intermediate network based on the QoS class specified within the request, wherein one or more of the devices along the LSP do not monitor resource allocation or maintain state information for the resource reservation protocol;
assigning a label to the request to encapsulate the request within a Multiprotocol Label Switching (MPLS) packet;
forwarding the MPLS packet along the LSP in accordance with the label;
receiving packets associated with the requested packet flow;
aggregating the packets with packets associated with other requested packet flows associated with the same QoS class;
assigning labels to the packets to encapsulate the packets within MPLS packets associated with the LSP; and
forwarding the MPLS packets in accordance with the labels.

2. The method of claim 1, wherein selecting comprises dynamically forming the LSP through the intermediate network in response to receiving the request.

3. The method of claim 1, wherein selecting comprises selecting the LSP from a set of LSPs.

4. The method of claim 1, wherein the QoS class specifies a bandwidth and a burst size, and wherein selecting the LSP comprises selecting the LSP from a set of LSPs to accommodate the requested bandwidth and burst size.

5. A method comprising:
receiving, in accordance with a resource reservation protocol and with an edge router of an intermediate network located between a source device and a destination, a request to reserve resources for a packet flow along a path through the intermediate network, wherein the request specifies a Quality of Service (QoS) class;
determining an allowable QoS level of service for the source device;
rejecting the request when the requested QoS class exceeds the allowable level of service for the source device;
when the requested QoS class does not exceed the allowable level of service for the source device, selecting at the edge router a Label Switched Path (LSP) within the intermediate network based on the QoS class specified within the request, wherein one or more of the devices along the LSP do not monitor resource allocation or maintain state information for the resource reservation protocol;
assigning a label to the request to encapsulate the request within a Multiprotocol Label Switching (MPLS) packet;
forwarding the MPLS packet along the LSP in accordance with the label;
receiving packets associated with the requested packet flow;
aggregating the packets with packets associated with other requested packet flows associated with the same QoS class;
assigning labels to the packets to encapsulate the packets within MPLS packets associated with the LSP; and
forwarding the MPLS packets in accordance with the labels.

6. The method of claim 1, further comprising:
receiving packets associated with the packet flow;
assigning to the packets labels associated with the LSP to encapsulate the packets within MPLS packets; and
forwarding the packets in accordance with the labels.

7. The method of claim 1, wherein the request conforms to the Resource Reservation Setup Protocol (RSVP).

8. The method of claim 7, wherein the request specifies the destination for the packet flow within an RSVP-enabled network, and selecting a Label Switched Path (LSP) comprises selecting the LSP to have a termination point of an edge router coupled to the RSVP-enabled network.

9. The method of claim 1, wherein the edge router comprises a first edge router, and wherein the LSP is formed through the network to between the first edge router to a second edge router.

10. The method of claim 9, wherein receiving a request comprises receiving a request to establish an end-to-end packet flow from a host coupled to the first edge router to a host coupled to the second edge router.

11. The method of claim 1, wherein forwarding the MPLS packet comprises forwarding the packet in accordance with routing information for the intermediate network.

12. The method of claim 1, further comprising:
receiving packets associated with the requested packet flow;
forwarding the packets along the LSP and encapsulated within MPLS packets;
receiving status information for the LSP; and
forwarding the packets along a different LSP and encapsulated within MPLS packets in response to the status information.

13. A method comprising:
at an edge router of an intermediate network between a source and a destination, mapping requests to reserve resources for end-to-end packet flows through the intermediate network to Label Switched Paths (LSPs) within the intermediate network by identifying groups of the packet flows having common forwarding equivalence classes and mapping the groups to respective LSPs, wherein devices within the intermediate network along the LSPs do not monitor resource allocation or maintain state information associated with the resource reservation protocol;
receiving, with the edge router, packets associated with the packet flows;
aggregating the packets for packet flows based on the common forwarding equivalence classes of the packet flows;
assigning to the packets Multiprotocol Label Switching (MPLS) labels based on the mapping to encapsulate the packets within MPLS packets; and
forwarding the MPLS packets along the LSPs based on the mapping.

14. The method of claim 13,
wherein the requests conform to a resource reservation protocol and specify quality of service (QoS) classes, and
wherein mapping the packet flows comprises mapping the packet flows to the LSPs based on: (1) bandwidth requirements of the packet flows in accordance with the QoS classes, and (2) current bandwidth allocations of the LSPs.

15. The method of claim 13, further comprising:
receiving status information for the LSPs; and
updating the mapping based on the status information.

16. The method of claim 15, wherein receiving status information comprises receiving MPLS messages carrying the status information.

17. A method comprising:
receiving, at an edge router of an intermediate network between a source device and a destination, a plurality of requests that conform to the Resource Reservation Setup Protocol (RSVP), and that specify Quality of Service (QoS) requirements for packet flows through an intermediate network;
mapping the RSVP requests to a set of Label Switched Paths (LSPs) of the intermediate network based on the QoS requirements of the requests and current bandwidth allocations for the LSPs so that the LSP will carry the packet flows to meet the QoS requirements of the requests, wherein mapping further includes identifying groups of the packet flows having common forwarding equivalence classes; and mapping the groups to respective LSPs, and wherein one or more devices within the intermediate network along the LSPs do not monitor resource allocation or maintain state information associated with the resource reservation protocol
receiving packets associated with the packet flows;
aggregating the packets for packet flows based on the QoS requirements;
assigning labels to the packets to encapsulate the packets within MPLS packets associated with the LSPs; and
forwarding the MPLS packets in accordance with the labels.

18. The method of claim 17, further comprising forwarding packets associated with the end-to-end packet flows along the LSPs based on the mapping.

19. A computer-readable medium encoded with data structures comprising:
reservation data representative of Resource Reservation Setup Protocol (RSVP) requests to reserve resources for packet flows through a network that does not monitor resource allocation associated with the packet flows in accordance with RSVP, wherein the reservation data includes a counter for a number of packets communicated through the packet flow;
path data representative of Label Switched Paths (LSPs) within the network that does not monitor resource allocation associated with the packet flows in accordance with RSVP; and
mapping data associating the RSVP requests with the LSPs to control forwarding of the packets through the LSPs of the network in accordance with the reservation data.

20. The computer-readable medium of claim 19, wherein the path data specifies an ingress device to the LSP, an egress device from the LSP, a bandwidth allocation for the LSP, and a current bandwidth usage for the LSP.

21. The computer-readable medium of claim 19, wherein the reservation data specifies a source device, a destination device, a bandwidth and burst size requested for the packet flow.

22. A computer-readable medium comprising instructions to cause a processor to:
receive a request to reserve resources for a packet flow along a path through a network, wherein the network does not monitor resource allocation associated with the packet flow, wherein the request specifies a Quality of Service (QoS) class;
select a Label Switched Path (LSP) within the network as a function of the QoS class;
assign a label to the request to encapsulate the request within a multiprotocol Label Switching (MPLS) packet;
forward the MPLS packet along the LSP in accordance with the label;
receive packets associated with the requested packet flow;
aggregate the packets with packets associated with other requested packet flows associated with the same QoS class;
assign labels to the packets to encapsulate the packets within MPLS packets associated with LSP; and
forward the MPLS packets in accordance with the labels.

23. The computer-readable medium of claim 22, further comprising instructions to initiate the formation of the LSP in response to receiving the request.

24. The computer-readable medium of claim 22, further comprising instructions to select the LSP from a set of LSPs.

25. A computer-readable medium comprising instructions to cause a processor to:
receive a Resource Reservation Setup Protocol (RSVP) request to reserve resources for a packet flow along a path through a network, wherein one or more label switch routers (LSRs) along the path does not monitor resource allocation associated with the packet flow as required by RSVP, wherein the request specifies a Quality of Service (QoS) class;
determine an allowable QoS class for the requested packet flow;
reject the RSVP request when the requested QoS class exceeds the allowable QoS class;
select a Label Switched Path (LSP) within the network as a function of the requested QoS class when the requested QoS class does not exceeds the allowable QoS class;
assign a label to the RSVP request to encapsulate the RSVP request within a multiprotocol Label Switching (MPLS) packet;
forward the MPLS packet along the LSP in accordance with the label;
receive packets associated with the requested packet flow;
aggregate the packets with packets associated with other requested packet flows associated with the same QoS class;
assign labels to the packets to encapsulate the packets within MPLS packets associated with LSP; and
forward the MPLS packets in accordance with the labels.

26. The computer-readable medium of claim 22, wherein the request conforms to a network signaling protocol.

27. The computer-readable medium of claim 26, further comprising instructions to, wherein the request conforms to the Resource Reservation Setup Protocol (RSVP).

28. The computer-readable medium of claim 22, further comprising instructions to:
receive status information for the LSP; and
forward the packets along a different LSP in response to the status information.

29. A routing device comprising:
a medium storing reservation data representative of requests to reserve resources for packet flows through a network, path data representative of Labeled Switch Paths (LSPs) within the network, wherein the requests conform to a resource reservation protocol unsupported by the network, and mapping data that associates the requests with the LSPs;

an interface to receive the requests; and
a control unit to forward packets associated with the packet flows along the LSPs based on the mapping data;
wherein the control unit updates the reservation data based on the request, selects respective LSPs to accommodate the requested packet flows, and updates the map data based on the selected LSPs, and
wherein the reservation data includes a counter for a number of packets communicated through the packet flow.

30. The routing device of claim 29 wherein, based on the mapping, the control unit assigns labels to the requests to encapsulate the request within Multiprotocol Label Switching (MPLS) packets, and forward the MPLS packets in accordance with the labels.

31. The routing device of claim 29 wherein, the path data specifies an ingress device to the LSP, an egress device from the LSP, a bandwidth allocation for the LSP, and a current bandwidth usage for the LSP.

32. The routing device of claim 29, wherein the reservation data specifies a source device, a destination device, a bandwidth and burst size requested for the packet flow.

33. The routing device of claim 29, wherein the control unit generates the mapping data to map the packet flows to the LSPs based on bandwidth requirements of the packet flows and current bandwidth allocations of the LSPs.

34. A routing device, comprising:
an access control module to generate a mapping between requests to reserve resources for end-to-end packet flows through a network and Labeled Switch Paths (LSPs) within the network, wherein the requests conform to a resource reservation protocol for reserving requests along paths through the network, and wherein the resource reservation protocol is unsupported by the network so that one or more devices within the network do not monitor resource allocation associated with the end-to-end packet flows;
an accounting module to generate accounting data describing Quality of Service requirements specified by the requests and consumption of bandwidth allocated to the LSPs; and
a control unit to forward packets associated with the end-to-end packet flows along the LSPs based on the mapping.

35. The routing device of claim 34, wherein the requests conform to the Resource Reservation Setup Protocol (RSVP), and that specify Quality of Service (QoS) requirements for packet flows through a network, and wherein the access control module maps the requests to the LSPs based on the QoS requirements of the requests and current bandwidth allocations for the LSPs.

36. The routing device of claim 34, wherein the access control module dynamically generates the mapping upon receiving the requests.

37. The routing device of claim 34, wherein the access control module receives configuration input describing a set of pre-established LSPs, and generates the mapping upon receiving the requests by selecting respective LSPs from the set.

38. The routing device of claim 34, further comprising a user interface to present the mapping to a user.

39. The routing device of claim 34, wherein the access control module receives status information for the LSPs, and updates the mapping based on the status information.

40. The routing device of claim 39, wherein the status information comprises MPLS messages carrying the status information.

41. A system comprising:
a first network having a first plurality of devices and a first router, wherein the first network executes a resource reservation protocol;
a second network having a second plurality of devices and a second router, wherein the second network executes the resource reservation protocol; and
an intermediate network coupling the first network to the second network, wherein the intermediate network does not monitor resource allocation associated with the end-to-end packet flows,
wherein the first and second routers receive resource reservation requests to reserve resources along end-to-end packet flows between devices of the first and second networks, and map the requests to a Labeled Switch Path (LSP) coupling the first and second networks through the intermediate network,
wherein the first and second routers updates reservation data based on the requests, select respective LSPs to accommodate the requested packet flows, and update the mapping based on the selected LSPs, and
wherein the first and second routers update the reservation data to maintain a counter for a number of packets communicated through each of the packet flows.

42. The system of claim 41, wherein the routers receive packets associated with the requested packet flows, and forward the packets along the LSP based on the mapping.

43. The system of claim 41, wherein the requests conform to the Resource Reservation Setup Protocol (RSVP).

44. The system of claim 41, wherein the routers assigns labels to the packets to encapsulate the packets within Multiprotocol Label Switching (MPLS) packets, and forward the MPLS packets in accordance with the labels.

* * * * *